Patented Mar. 26, 1940

2,194,677

UNITED STATES PATENT OFFICE 2,194,677

SILVER ANIMAL MUCIN AND PROCESS FOR PRODUCING SAME

Herman J. Schneiderwirth, Mount Vernon, N. Y.

No Drawing. Application December 19, 1938,
Serial No. 246,675

17 Claims. (Cl. 260—114)

My invention relates to new chemical compounds from mucins and refers particularly to those obtained by the interaction of silver, its salts or compounds, with true mucins, such as those separated from mucus producing glands, mucous membranes and other cells of the animal body.

The object of my invention is to produce certain new compounds in which silver, or its salts or compounds, are combined with animal mucins, either chemically as silver mucin salts, and/or physicochemically, whereby the mucins form complex compounds with, or act as protective colloids for, the silver or its compounds while the latter are in a finely dispersed state of colloidal dimensions. These compounds are suitable for use as therapeutic agents in different fields of medicine.

It is known that numerous silver compounds of a colloidal nature have been introduced into medicine as therapeutic agents, mainly for prophylaxis against, and treatment of, infected mucous membranes, and that a certain amount of success has been attained with these compounds. The latter are generally prepared by combining silver in a colloidal form with proteins such as albumins, globulins, casein, gelatine and others of a similar character. However, the therapeutic action of these compounds is limited by the fact that they fail to a great extent to combine intimately enough with, and to penetrate deeply enough into, the mucosa or other cell structures to which they are applied. There are two main reasons for this failure of maximum efficiency.

Firstly, these products are not sufficiently compatible with, and may even be antagonistic to, the cell tissue of the mucous membranes because they are of a different biological nature from the serous fluids surrounding and/or filling the tissue cells of the mucosa. As a result of this the intimate combination between infected cell and silver protein essential for maximum effect does not take place.

Secondly, these compounds generally lack the ability to adhere tenaciously to the infected area for a long period of time, which is another important requirement for penetration of a therapeutic agent into the deeper layers of the mucosa where tiny ducts and glands form hiding places for bacteria.

I have now found that the above disadvantages and ineffective features of former compounds of this character can be overcome, and that biologically superior silver products are obtained when silver, or its compounds, are combined with exactly the same biological substance which is secreted by glands and cells of mucous membranes. This substance is animal mucin secreted by the goblet cells of mucous glands and almost universally present in the cell tissue of the living body.

There are, however, in addition to superior tissue compatibility and adhesive power, two more medically important properties of a physicochemical nature present in the silver mucins which make the latter entirely different from the previously known silver compounds, thereby even more impressively demonstrating the superior qualities and the novelty of the products of my invention.

Firstly, when a concentrated solution of silver mucins, which forms a mucilaginous paste is applied to infected tissue or denuded skin surfaces, the surface of the silver mucin dries within from two to five minutes, depending on the concentration. Hence, a protective biological film, or skin, is formed which combines the physiological properties of animal mucin with the antiseptic action of silver. This biological film clings tenaciously to the cell tissue and hence a constant antiseptic action is maintained at the contact zone between tissue and silver mucin because the watery serous liquid present in the tissue keeps the contact layer moist and dissolves slowly and constantly active silver mucin.

Secondly, a highly desirable property of therapeutic substances applied to inflamed mucous membranes in general is the ability to absorb fluids, because in practically all inflammatory conditions, there exists an edema, which is an abnormal accumulation of fluids in the lymph spaces of the tissue. Silver mucins which possess an extremely high degree of swelling power and are able to combine with liquids of several times their dry weight possess increased valuable properties. This process is reversible. While a dry film, or concentrated solution, of silver mucin is able to combine with comparatively large amounts of fluids, it is also able to lose the liquid again rather quickly by evaporation, and, thereafter, is again in a physical state to combine with further quantities of fluids until a complete saturation with non-volatile matter has taken place. At this stage the saturated silver mucin can be removed with warm water and replaced by a new application when needed. It is evident that this particular physico-chemical property of the silver mucins is of great medical value, because the removal of excess liquid in form of serum, pus, decayed cells, bacterial toxins and other waste products, by a biological substance of the same nature as the normal secretions considerably aids antisepsis and cell regeneration.

Silver mucins are non-irritant even in very high concentrations. They have been applied with great success to the most delicate infected mucous membranes and wounds in the form of a jelly, in the form of water solutions, in the form of a dry powder and in a solid form such as suppositories and the like.

The antiseptic action of silver mucin has been extensively investigated, using existing colloidal silver products as a comparison. While for certain bacteria, the antiseptic values obtained were equal to the comparative products, silver mucins showed a far higher antiseptic action when streptococci of different strains were used as test organisms.

Having thus described the superior properties, as well as the differences, of silver mucins compared with products of a similar nature known and used today in medicine, I will now give a short description of animal mucins, as well as detailed processes for preparing the silver products thereof.

Animal mucins can be obtained chemically pure in a dry powdered form by methods described in the chemical literature. They are acidic in nature and form salts with alkali and alkaline earth metals and as such are soluble in water, forming solutions of a stringy, mucilaginous nature. Such solutions may react slightly acid or neutral or alkaline, depending on the amount of alkali used to neutralize part, or all, of the acidic groups present. Those mucins which can be obtained from animal organs without difficulty in comparatively large quantities are named as follows:

1. Gastric mucin, obtained from stomachs of animals, preferably hogs.
2. Submaxillary mucin, obtained from salivary glands of animals, preferably cattle.
3. Gall bladder mucin, obtained from gall bladders and annexa of animals.
4. Urinary mucin, obtained from the urinary bladder and glands of the urinary tract of animals.

While the above-mentioned mucins have been used mainly in the present invention, mucins of other animal organs, for instance mucins of the umbilical cord, or mucin present in connective tissue, may also be used in preparing silver mucins with essentially the same results.

Detailed methods for preparing silver mucins are described in the following:

EXAMPLE I

*Alkaline mucin solutions treated with silver salts*

100 grams of gastric mucins are dissolved in a solution of 28 grams of sodium hydroxide in 2000 c. c. of warm water by rubbing the powder first in a mortar while gradually adding more and more of the sodium hydroxide solution and thereafter by shaking and warming the grayish mass in a glass flask until the solution is completed. The sticky, fully cloudy solution contains 5% of the sodium compound of gastric mucin with an excess of sodium hydroxide. To this solution is added gradually and slowly while shaking a solution of 14.6 grams of silver nitrate dissolved in 200 c. c. of distilled water. After constant agitating for approximately one hour, the whole is put aside preferably in an ice box protected from light. After 48 hours, two layers have formed, the upper layer is fairly clear, comprising approximately 60% of the whole quantity while the lower layer consists of a gray cloudy precipitate. The clear layer is now separated and filtered or centrifuged. Thereafter approximately two volumes of alcohol (methyl or ethyl) and/or acetone are added. Thereby a precipitate is formed, after standing for approximately 24 hours. The precipitate, consisting of a soft, elastic, rubber-like mass, is now separated from the alcohol-water solution and washed repeatedly with fresh warm alcohol plus water. Thereafter the cake is pressed between wood, glass or the like, until practically all of the alcohol is removed. Now approximately 600 c. c. of warm distilled water are added and the whole is warmed and shaken until a complete solution has taken place. The quite viscous solution is now centrifuged and finally evaporated to dryness preferably in a vacuum oven. All manipulations are carried out in a dark room. The final product consists of dark grayish scales soluble in water and sensitive to light. It contains approximately 9% silver in the form of its oxide.

Instead of using silver nitrate a solution of another silver salt like silver lactate or silver acetate, etc., may be used in equivalent quantities.

Instead of using sodium hydroxide to dissolve gastric mucin, any other alkali or alkali earth metal salt may be used.

Instead of using the acid original gastric mucins, substantially neutral alkali or alkaline earth metal salts of gastric mucin may be used without an excess of an alkali hydroxide.

EXAMPLE II

*Reduction of the products obtained in Example I*

100 grams of gastric mucin are treated in the same manner as described under Example I. After the fairly clear part of the mucin silver compound has been separated from the precipitate the liquid is agitated and warmed in a water bath for several hours at a temperature of from 60 to 70 degrees centigrade. The product gradually turns dark brown. When no more color change occurs, the reduction is completed. Now alcohol and/or acetone is added to the reduced solution and the whole is treated in substantially the same way as described in Example I. Dark brown almost black scales are obtained after evaporation in a vacuum dryer. The product forms dark brown solutions with water and is not sensitive to light. It contains approximately 10% silver in the form of its reduced oxide.

The reduction of the silver is brought about naturally by warming, because mucins consist chemically of nitrogen-containing carbohydrates which as such are reducing agents. However, such a natural reduction is completed only after many hours of treatment. The reduction is greatly accelerated when, while warming, small amounts of reducing agents are added to the solution. I have used hydrazin hydrate, ferro sulphate plus sodium citrate, fructose, amino compounds, aldehydes, and others. Furthermore, exposure to day and sunlight greatly accelerate reductions.

EXAMPLE III

*Using freshly prepared silver oxide*

100 grams of submaxillary mucins are dissolved in a solution of 28 grams of sodium hydroxide in 2000 c. c. of warm water by rubbing, shaking and warming the product. Now silver oxide is prepared by gradually and slowly adding to a solution of 14 grams of silver nitrate in 500 c. c. of water a 1% solution of sodium hydroxide until all the silver is converted into silver oxide. The wet, well washed precipitate is suspended in distilled water and this fine suspension is gradually and slowly added to the solution of submaxillary mucin while the latter is kept in a water bath at a temperature of from 70 to 80 degrees centigrade. Slowly the color of the mixture turns from gray into dark brown while the silver oxide goes gradually into solution. When no more color change takes place, the process is completed and the solution is now centrifuged and thereafter precipitated with alcohol and substantially treated as described before. Dark brown scales are obtained containing approximately 8% silver in the form of its reduced oxide.

EXAMPLE IV

*Preparing silver products with previously clarified mucins*

100 grams of substantially neutral sodium compound of gastric mucin are dispersed in 2000 c. c. of distilled water. They form a fully cloudy sticky and viscous mass which does not separate even after long centrifuging. To this solution 12 c. c. of a 10% sodium hydroxide solution are added. Thereafter 80 c. c. of strong ammonia water (26° Bé.) are added. The whole is mixed well and set aside preferably on ice for approximately 48 hours. After this time a clear serous liquid of a light yellow color has separated comprising approximately 70% of the whole solution while a flaky precipitate has settled to the bottom. The clear liquid is now separated and neutralized by adding gradually an acid-like acetic, lactic, citric, tartaric, formic, phosphoric or any other acid. Thereafter approximately 55 c. c. of a 10% sodium hydroxide solution are added. While shaking and warming this alkaline solution gradually and slowly a solution of 6.6 grams of silver nitrate in 200 c. c. of water are added. The whole is kept at a temperature of from 60 to 70° centigrade while agitating. Gradually the solution takes on a dark brown color and when no more color change occurs the process is completed. The reduction may be accelerated by adding reducing agents as described in the foregoing example.

Products obtained in the above way were found to be superior in keeping quality of their water solutions from those described in the other examples.

Instead of adding sodium hydroxide and ammonia to the neutral suspensions of the mucin, sodium hydroxide and ammonia may also be added to the normal, not neutralized acid suspensions of mucins.

Instead of adding sodium hydroxide and ammonia also related alkaline reacting agents may be used such as aldehyde ammonia, amines of the fatty and aromatic series like alkyl amines, benzyl amines, further quaternary ammonium bases and others. Also sodium or other alkali carbonates or hydroxides may be employed. In order to obtain optimum action with regard to clarification and yield in different mucin solutions, these chemicals may be added alone or in combination with each other in quantities and combinations which I have determined in experimentation for different mucin solutions.

EXAMPLE V

*Preparing silver compounds with clarified mucins*

50 grams of gallbladder mucin powder are dissolved in a solution of 9.3 grams of sodium carbonate in 1000 c. c. of water. The solution is cloudy and has a gray greenish appearance. 6 grams of aldehyde ammonia dissolved in 50 c. c. of water are added and the whole is put aside preferably in an ice box. After 48 hours a clear zone comprising approximately 70% of the whole liquid has formed above a greenish precipitate. This clear zone is separated and freshly prepared silver oxide is added and the whole is treated in substantially the same way as described in Example III. Reduction takes place rather quickly on account of the reducing aldehyde ammonia present. Also in this example the clear part of the mucin solution may be neutralized as described in Example IV and after adding an excess of sodium hydroxide a solution of a silver salt may be added. Thereby the silver oxide is produced by chemical reaction in the presence of the mucin. The latter thereafter immediately combines with the silver oxide while it is being formed.

After alcohol and/or acetone precipitation, the precipitate is washed, redissolved in water and evaporated with substantially the same results as described in the examples before.

EXAMPLE VI

*Preparing silver compounds with previously clarified mucins*

50 grams of urinary mucin are dissolved in a solution of 7 grams of sodium hydroxide in 1000 c. c. of water. Thereafter 4.5 grams of ethylene diamine are added and after thoroughly mixing the whole is put aside for 48 hours preferably in an ice box. After this time a clear solution comprising about 65% of the whole liquid has formed above a cloudy precipitate. The clear portion is separated and the alkaline solution is neutralized with an acid. Thereafter a saturated water solution of 14 grams of sodium carbonate are added to the neutral solution. Thereafter a solution of 9 grams of silver nitrate dissolved in 500 c. c. of water are added very slowly and very gradually while cooling the mixture on ice. A cloudiness develops which slowly disappears while shaking the mixture at room temperature for several hours.

Thereafter the colloidal solution is precipitated by alcohol and/or acetone. The precipitate is redissolved in distilled water, centrifuged and evaporated, preferably in a vacuum dryer. All manipulations are carried out in a dark room. The final product consisting of grayish scales is believed to consist of mucin silver carbonate containing approximately 8.5% silver. The product is light sensitive. When concentrated hydrochloric acid is added to the scales carbonic acid is liberated.

EXAMPLE VII

*Preparing silver halogen compounds with mucins*

Reduced silver mucins described in Examples II, III, IV, and V, are converted into halogen silver mucin compounds by treating the described dark brown, fully reduced solutions of gastric, submaxillary, gall-bladder, or unitary mucin silver oxides with iodine, bromine and chlorine in the following manner:

After complete reduction of, for instance, gastric mucin silver oxide as described in Example II, or in Example IV, the reduced solutions are filtered or centrifuged. To 1000 c. c. of the filtrate are gradually and slowly added a solution of 5.9 grams of iodine and 9.2 grams of potassium iodide in 100 c. c. of water while the whole is warmed in a water-bath to approximately 60° centigrade while shaking continuously. The mucin silver solution changes its color gradually from brown to light cream color while shaking and warming. After standing for several hours the liquid is filtered. Thereafter 2000 c. c. of alcohol (methyl or ethyl) and/or acetone are added. A cream colored precipitate forms which is separated from the alcohol-water liquid after standing for approximately 24 hours. The rubber-like cake is washed repeatedly with a mixture of alcohol and water and finally pressed between wood or glass or clay plates until most of the alcohol is removed.

Thereafter the cake is redissolved in warm distilled water, centrifuged and evaporated preferably in a vacuum dryer. Cream colored scales are obtained after drying containing approximately 22% silver iodide in a colloidal, water soluble form.

The same results are obtained when finely powdered iodine is added to the reduced mucin silver oxide solutions while the mixture is warmed and shaken for several hours.

The addition of bromine or chlorine dissolved in water or in their original form in proportions which are equivalent to the silver oxide present in the mucin silver solutions result in the formation of silver mucin bromides and silver mucin chlorines. They also form cream colored scales after drying and their water solutions are white or cream colored.

In conclusion it is stated that alcohol precipitation in the examples given may be substituted by dialysis and/or electro-dialysis in order to remove electrolytes (salts). Thereby the alcohol precipitation can be eliminated.

The precipitates obtained by the addition of alcohol or acetone are redissolved in water, after removing as much alcohol as possible, because I have found that when the separated cakes are dried without first redissolving them in water, that the mucins "harden" and subsequently resist to some extent resolution in water after drying.

In the specific examples given, any of the mucins described may be substituted for other types of animal mucins without in the least influencing the final results obtained.

Having thus described in some detail the preparation of animal silver mucins, I do not limit myself to the exact quantities of chemicals used, nor to the exact following of the processes outlined, because the nature of this invention plainly indicates that the same or similar results can be obtained when other proportions of chemicals and similar procedures are used. However, the fundamentals of obtaining these compounds in one way or another are above clearly outlined.

*Properties and analytical data of the products obtained*

The products described are new and different from any compound containing silver in whatever form known today.

I have found that the physiologically active mucins used in the preparation of these products play a predominant role in the therapeutic action of the new products while the silver is of secondary importance. Quite the opposite is the case for silver compounds known and used today. Biological mucin-silver compounds are distinguished by the following characteristics:

1. They have better tissue compatibility than other silver compounds because they consist of a biological substance identical with the one present upon and within cells of mucous membranes to which the products are applied.

2. They have an unparalleled ability to adhere tenaciously to tissue surfaces.

3. They are able to absorb, as no other therapeutic substance probably can, large quantities of liquids like toxins, bacteria, decayed cells, waste products, etc., on account of their unusually high "swelling power."

4. They are reversible biological colloids, meaning that after absorption of liquids they may dry completely but are able thereafter to again redissolve, swell and absorb liquids again.

A strongly adhering "biological mucin-silver skin," for instance, is formed when a concentrated water solution of the products, for instance, 20%, is applied to denudated and/or ulcerated skin surfaces like burns, ulcers, etc. The products dry after a few minutes but do not lose their ability to absorb liquids while at the same time bacteria are destroyed by the direct action of slowly released silver ions.

The therapeutic action of mucin-silver products therefore lasts for a long period of time and during this time the products combine the peculiar physio-chemical properties and the physiological protective action of mucins with the antiseptic action of silver.

It is evident from the foregoing, that the therapeutic use of the new products is indicated in pathogenic conditions different in most cases from those for which known silver compounds are generally employed today. I have used the products described in the form of a surgical jelly, in form of suppositories, and in form of dusting powders in form of solutions. Highly satisfactory results were obtained in the treatment of indolent ulcers, in burns of all types, in the pre- and post-operative treatment of hemorrhoids, in vaginal treatment and in certain skin diseases. The products relieve irritation and spasm and a rapid healing takes place. Ulcerative colitis, treated by topical application after a cleansing enema has been given, is another field of application.

*Analytical data*

The various compounds made were analyzed with regard to nitrogen and silver content of which the following table is an example:

| Gastric | | Submaxillary | | Gallbladder | | Urinary | |
| --- | --- | --- | --- | --- | --- | --- | --- |
| Percent N | Percent $Ag_2O$ | Percent N | Percent $Ag_2O$ | Percent N | Percent $Ag_2O$ | Percent N | Percent $Ag_2O$ |
| 6.8 | 9.5 | 6.9 | 11.0 | 7.8 | 10.4 | | |
| 6.6 | 10.1 | | | | | | |
| Percent N | Percent AgI | Percent N | Percent AgI | Percent N | Percent AgI | Percent N | Percent AgI |
| 6.1 | 22.0 | 6.3 | 19.8 | | | 6.2 | 18.9 |
| 5.9 | 20.5 | | | | | | |
| 6.1 | 18.8 | | | | | | |

N was determined by the Kjeldahl method, $Ag_2O$ by the titration method and AgI by heat precipitation with hydrochloric acid.

What I claim is:

1. A process for the production of silver compounds of animal mucins, which are not precipitable by a solution of lead acetate and which reduce Benedict's solution, which comprises treating a solution of animal mucins with a solution of a silver salt, precipitating the silver salts of the animal mucins therefrom, and separating said silver salts from said solution.

2. A process for the production of silver compounds of animal mucins, which are not precipitable by a solution of lead acetate and which reduce Benedict's solution, which comprises treating an aqueous solution of animal mucins with a solution of a silver salt, precipitating the silver salts of the animal mucins therefrom, and separating said silver salts from said solution.

3. A process for the production of silver compounds of animal mucins, which are not precipitable by a solution of lead acetate and which reduce Benedict's solution, which comprises treating an alkaline solution of animal mucins with a solution of a silver salt, precipitating the silver salts of the animal mucins therefrom, and separating said silver salts from said solution.

4. A process for the production of silver compounds of animal mucins, which are not precipitable by a solution of lead acetate and which reduce Benedict's solution, which comprises treating a solution of animal mucins with a solution of a silver salt, precipitating the silver salts of the animal mucins therefrom by means of an alcohol, and separating said silver salts from said solution.

5. A process for the production of silver compounds of animal mucins, which are not precipitable by a solution of lead acetate and which reduce Benedict's solution, which comprises treating an aqueous solution of animal mucins with a solution of a silver salt, precipitating the silver salts of the animal mucins therefrom by means of an alcohol, and separating said silver salts from said solution.

6. A process for the production of silver compounds of animal mucins, which are not precipitable by a solution of lead acetate and which reduce Benedict's solution, which comprises treating an alkaline solution of animal mucins with a solution of a silver salt, precipitating the silver salts of the animal mucins therefrom by means of an alcohol, and separating said silver salts from said solution.

7. A process for the production of silver compounds of animal mucins, which are not precipitable by a solution of lead acetate and which reduce Benedict's solution, which comprises treating a solution of animal mucins with a solution of a silver salt, reducing said silver salt, precipitating the silver salts of the animal mucins therefrom, and separating said silver salts from said solution.

8. A process for the production of silver compounds of animal mucins which comprises treating a solution of animal mucins with a solution of a silver salt, reducing said silver salt by heating said solution thereof, precipitating the silver salts of the animal mucins therefrom, and separating said silver salts from said solution.

9. A process for the production of silver compounds of animal mucins which comprises treating a solution of animal mucins with a solution of a silver salt, reducing said silver salt by means of a reducing agent, precipitating the silver salts of the animal mucins therefrom, and separating said silver salts from said solution.

10. A process for the production of silver compounds of gastric mucins, which are not precipitable by a solution of lead acetate and which reduce Benedict's solution which comprises treating a solution of gastric mucins with a solution of a silver compound, precipitating the silver salts of the gastric mucins therefrom and separating said silver salts from said solution.

11. A process for the production of silver compounds of gastric mucins, which are not precipitable by a solution of lead acetate and which reduce Benedict's solution, which comprises treating a solution of gastric mucins with a solution of a silver compound, reducing said silver salt, precipitating the silver salts of the gastric mucins therefrom and separating said silver salts from said solution.

12. A process for the production of silver compounds of gastric mucins, which are not precipitable by a solution of lead acetate and which reduce Benedict's solution, which comprises treating a solution of gastric mucins with an alkaline solution of a silver compound, precipitating the silver salts of the gastric mucins therefrom and separating said silver salts from said solution.

13. A process for the production of silver compounds of gastric mucins which comprises treating a solution of gastric mucins with an alkaline solution of a silver compound, reducing said silver salt, precipitating the silver salts of the gastric mucins therefrom and separating said silver salts from said solution.

14. As new compounds, the silver mucins obtainable from animal mucins, which when dry are in the form of from cream colored to brown scales or powder, soluble in water, sensitive to light, their solutions not being precipitable with solutions of lead acetate and which reduce Benedict's solution.

15. As new compounds, the silver mucins obtainable from gastric mucins, which when dry are in the form of from cream colored to brown scales or powder, soluble in water, sensitive to light, their solutions not being precipitable with solutions of lead acetate and which reduce Benedict's solution.

16. As new compounds, the silver mucins obtainable from gall bladder mucins, which when dry are in the form of from cream colored to brown scales or powder, soluble in water, sensitive to light, their solutions not being precipitable with solutions of lead acetate and which reduce Benedict's solution.

17. As new compounds, the silver mucins obtainable from urinary mucins, which when dry are in the form of from cream colored to brown scales or powder, soluble in water, sensitive to light, their solutions not being precipitable with solutions of lead acetate and which reduce Benedict's solution.

HERMAN J. SCHNEIDERWIRTH.